United States Patent
Lin et al.

(10) Patent No.: US 9,948,158 B2
(45) Date of Patent: Apr. 17, 2018

(54) MOTOR COOLING SYSTEMS AND DEVICES

(71) Applicant: Gogoro Inc., Hong Kong (CN)

(72) Inventors: Sung-Ching Lin, New Taipei (TW);
Yu-Chang Guo, New Taipei (TW);
Yi-Hsiang Lin, Taipei (TW);
Ying-Hung Li, Taipei (TW)

(73) Assignee: Gogoro Inc., Hong Kong (CN)

( * ) Notice: Subject to any disclaimer, the term of this patent is extended or adjusted under 35 U.S.C. 154(b) by 173 days.

(21) Appl. No.: 14/810,157

(22) Filed: Jul. 27, 2015

(65) Prior Publication Data
US 2016/0028292 A1    Jan. 28, 2016

Related U.S. Application Data

(60) Provisional application No. 62/029,797, filed on Jul. 28, 2014.

(51) Int. Cl.
| | |
|---|---|
| *H02K 9/00* | (2006.01) |
| *H02K 5/00* | (2006.01) |
| *H02K 5/20* | (2006.01) |
| *H02K 9/19* | (2006.01) |

(52) U.S. Cl.
CPC ............. *H02K 5/20* (2013.01); *H02K 9/19* (2013.01)

(58) Field of Classification Search
CPC .................................. H02K 9/00; H02K 9/19
USPC ..................... 310/54, 58–59, 89, 64
See application file for complete search history.

(56) References Cited

U.S. PATENT DOCUMENTS

| | | | |
|---|---|---|---|
| 2005/0151431 A1 | 7/2005 | Cronin et al. | |
| 2005/0163630 A1* | 7/2005 | Hoshino | F01C 21/10 417/410.3 |
| 2009/0009013 A1* | 1/2009 | Baumann | H02K 5/20 310/54 |
| 2010/0001597 A1 | 1/2010 | Noll | |
| 2011/0101802 A1 | 5/2011 | Hennings et al. | |
| 2012/0161553 A1* | 6/2012 | Kao | H02K 5/20 310/54 |
| 2013/0342046 A1* | 12/2013 | Hyun | H02K 5/20 310/54 |
| 2014/0077634 A1* | 3/2014 | Fischer | F28F 13/06 310/54 |

FOREIGN PATENT DOCUMENTS

| | | |
|---|---|---|
| JP | 2001-25211 A | 1/2001 |
| JP | 2008-193756 A | 8/2008 |

OTHER PUBLICATIONS

International Search Report dated Oct. 27, 2015, for corresponding International Application No. PCT/2015/042301, 3 pages.

* cited by examiner

*Primary Examiner* — Jose Gonzalez Quinones
(74) *Attorney, Agent, or Firm* — Perkins Coie LLP

(57) ABSTRACT

A motor cooling system for cooling a motor unit including a stator assembly and a rotor assembly configured to rotate a rotor shaft, which includes a stator casing and an arm casing. The stator casing includes a stator casing body having a stator casing wall with an internal cavity to receive the motor unit and a rib with a groove defined between adjacent portions of the rib. The arm casing includes an arm casing body having an internal cavity to receive the stator casing and a port in fluid communication with the groove.

20 Claims, 4 Drawing Sheets

MOTOR COOLING SYSTEMS AND DEVICES

BACKGROUND

Technical Field

The present disclosure generally relates to electric devices and, more particularly, to electric motor cooling systems and devices.

Description of the Related Art

The concern over the volume and cost of fossil fuels available in the future is fueling the proliferation of electric powered devices, including vehicles such as automobiles, trucks, motorcycles, scooters, golf carts, and utility carts, as well as other devices such as lawnmowers, chain saws, and the like. The motors that drive such vehicles and other electrically powered devices during operation generate heat due to copper energy losses, iron energy losses, and mechanical losses, among other things.

As the demand increases for more powerful motors to drive devices faster, with more acceleration and power, the need to cool such motors efficiently without increasing noise, weight, and complexity will increase. Examples of techniques used to cool electric motors include enclosing the motor assemblies in housings and passing cooling liquids through the housings to facilitate dissipation of heat, or providing fans that provide increased airflow to the internal and/or external components of the motor. While these techniques can contribute to the cooling of an electric motor, they each have drawbacks, such as added weight, increased noise, low efficiencies, and added complexity.

By way of example, cooling systems utilizing conventional housings may include a plurality of grooves formed around spaced apart concentric ribs. The cooling liquid is discharged to flow around each groove to cool a motor assembly. However, the heat exchange coefficients of such housings are often compromised due to lower flow rates and fouling effects, among other things. Additionally, such housings add weight, manufacturing costs, and inefficient use of space. Further, such housings typically comprise multiple components, which lead to time consuming assembly processes resulting in high manufacturing and labor costs. By way of example, such housings generally include separate inner and outer members and upper and lower covers to seal the opposing ends of the inner and outer members, for example, in U.S. Publication No. 2013/0342046. Assembling such conventional housing requires multiple steps to fasten each component to the other.

With the ever-expanding interest in reducing dependence on fossil fuels and improving the environment, electric vehicles and electrically powered devices will continue to increase in popularity. Vehicle and device owners and manufacturers of such items will be interested in motor cooling systems that are easy to assemble/disassemble, improve heat exchange efficiency, reduce manufacture and labor costs, and are reliable.

BRIEF SUMMARY

As an overview, motor cooling systems and devices are described in the present disclosure. The described motor cooling systems and devices provide improvements to the heat transfer efficiencies of the motor assemblies. The motor cooling systems and devices, for example, provide increased flow rates of the cooling liquids and heat transfer surface areas. Further, the motor cooling systems and devices, exemplary embodiments of which are described herein, have structures that are compact, rigid and lend themselves to simplified and efficient manufacturing and assembly processes.

An embodiment of a motor cooling system used for cooling a motor unit including a stator assembly and a rotor assembly configured to rotate a rotor shaft, includes a stator casing and an arm casing. The stator casing includes a generally cylindrical stator casing body having a longitudinal axis. The stator casing body includes a stator casing wall extending between a first end and a second end of the stator casing body, the stator casing wall including an interior surface and an exterior surface. The interior surface of the stator casing wall can define an internal cavity in the stator casing, which is configured to receive the motor unit. The exterior surface of the stator casing wall includes a rib extending along the exterior surface of the stator casing wall, with the adjacent portions of the rib defining a groove. The arm casing includes a generally cylindrical arm casing body. The arm casing body includes an arm casing wall extending between a first end and a second end of the arm casing body, to define an arm casing cavity, and is configured to receive the stator casing. The arm casing body further includes an end wall adjacent the second end of the arm casing body and radially extending inward from the arm casing wall toward the longitudinal axis, and a port located in the arm casing wall, the port being in fluid communication with the groove.

Exemplary embodiments described herein include an electric motor that includes a cooling system for facilitating thermal exchange between an electric motor unit and a coolant received from a coolant source. The electric motor includes a stator casing and an arm casing. The stator casing includes a generally cylindrical stator casing body having a longitudinal axis. The stator casing body includes a stator casing wall extending between a first end and a second end of the stator casing body, the stator casing wall including an interior surface and an exterior surface. The interior surface of the stator casing wall can define an internal cavity in the stator casing, which is configured to receive the electric motor unit. The exterior surface of the stator casing wall includes a rib extending substantially helically along the exterior surface of the stator casing wall, with the adjacent portions of the rib defining a groove. The arm casing includes a generally cylindrical arm casing body. The arm casing body includes an arm casing wall extending between a first end and a second end of the arm casing body, the arm casing body defining an arm casing cavity in the arm casing body. The arm casing cavity is configured to receive the stator casing therein.

BRIEF DESCRIPTION OF THE SEVERAL VIEWS OF THE DRAWINGS

In the drawings, identical reference numbers identify similar elements. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and they have been solely selected for ease of recognition in the drawings.

DETAILED DESCRIPTION

Figure 1:
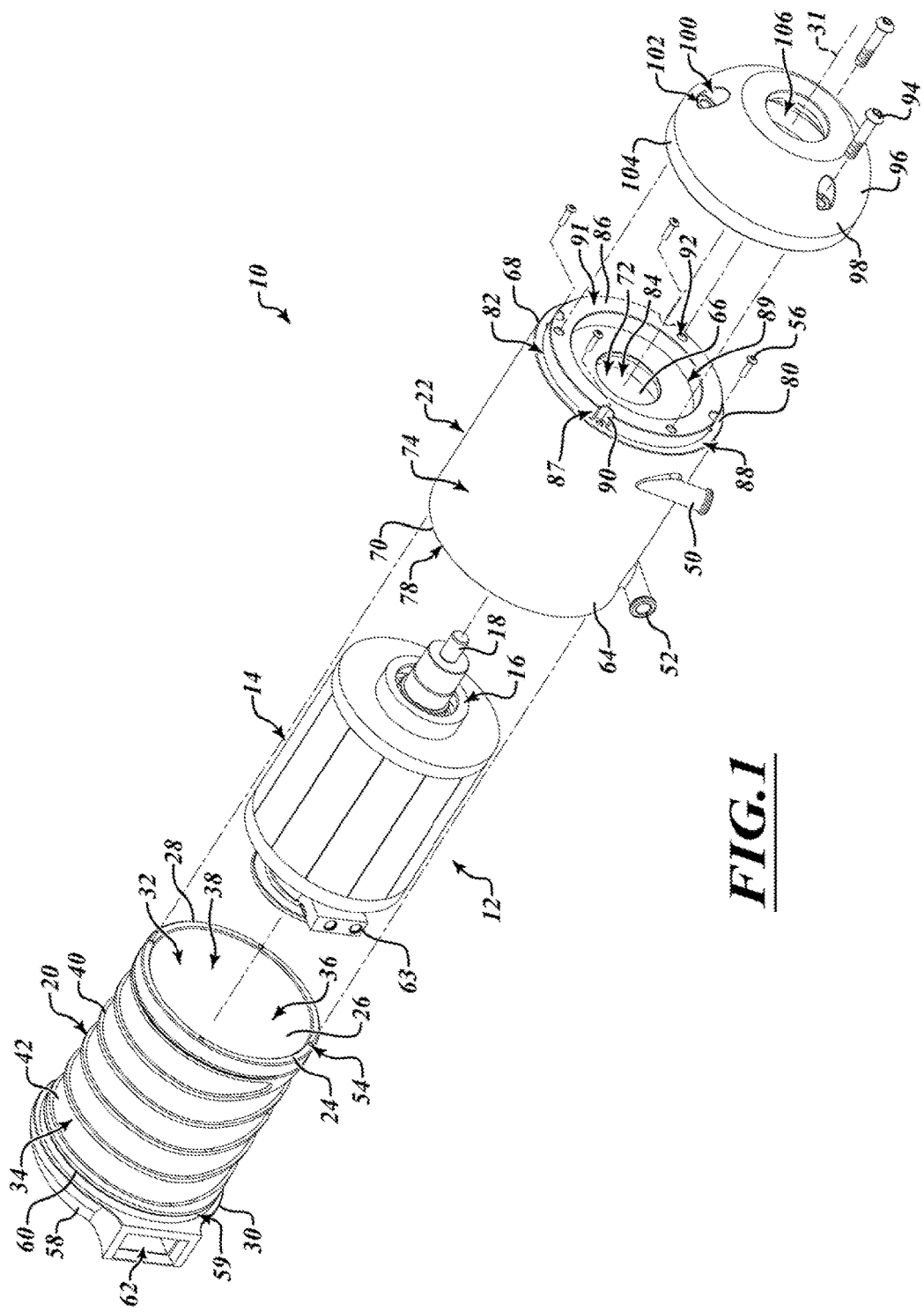
FIG. 1 is an exploded view of a motor cooling system according to one embodiment of the present disclosure.

It will be appreciated that, although specific embodiments of the subject matter of this application have been described herein for purposes of illustration, various modifications may be made without departing from the spirit and scope of the disclosed subject matter. Accordingly, the subject matter of this application is not limited except as by the appended claims.

In the following description, certain specific details are set forth in order to provide a thorough understanding of various aspects of the disclosed subject matter. However, the disclosed subject matter may be practiced without these specific details. In some instances, well-known structures and methods of attaching structures to each other comprising embodiments of the subject matter disclosed herein have not been described in detail to avoid obscuring the descriptions of other aspects of the present disclosure.

Unless the context requires otherwise, throughout the specification and claims that follow, the word "comprise" and variations thereof, such as "comprises" and "comprising" are to be construed in an open, inclusive sense, that is, as "including, but not limited to."

Reference throughout the specification to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same aspect. Furthermore, the particular features, structures, or characteristics may be combined in any suitable manner in one or more aspects of the present disclosure.

Reference throughout the specification to electric devices includes electric motors, electric generators, and the like. The phrase "electric device" should not be construed narrowly to limit it to the illustrated electric motor, but rather, the phrase "electric device" is broadly used to cover all types of structures that can generate electrical energy from a mechanical input or generate mechanical energy from an electrical input.

In the figures, identical reference numbers identify similar features or elements.

Generally described, the present disclosure is directed to examples of electric devices 12, such as electric motor units and assemblies, which include a stator assembly 14 and a rotor assembly 16. The stator assembly 14 generally comprises a stator with windings and a plurality of laminations that are stacked together to form a stator core, and through the plurality of laminations the windings are inserted. When the windings are energized, they generate an electromagnetic field and heat energy. The rotor assembly 16 is generally mounted within a bore of the stator assembly 14. The electromagnetic field creates a magnetic force which causes rotation of the rotor assembly 16 and an output or rotor shaft 18 coupled thereto. To dissipate the heat generated by operation of the electric device 12, the electric device 12 is cooled by various embodiments of cooling systems and devices described herein that advantageously facilitate thermal exchange in an efficient, robust, compact form factor, and at a reasonable cost.

Referring now to FIGS. 1 through 4, there is shown a motor cooling system 10 for cooling an electric device 12 comprising a stator assembly 14, a rotor assembly 16, and a rotor shaft 18 rotatably driven by the electric device 12, according to one embodiment. The electric device 12 is received in a stator casing 20 and an arm casing assembly 22.

Figure 3:
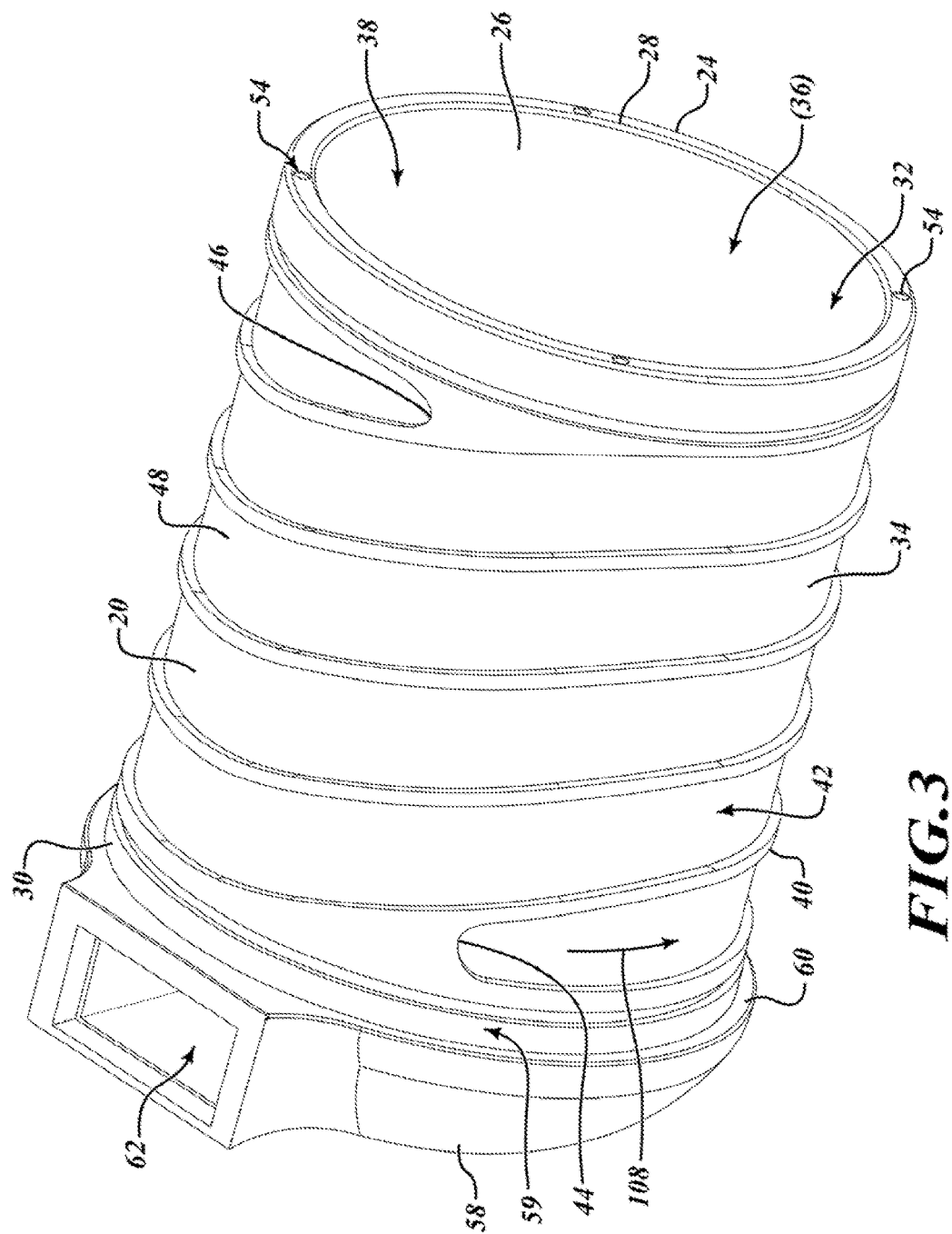
FIG. 3 is a perspective view of a stator casing of the motor cooling system of FIG. 1.

As illustrated in FIGS. 1 and 3, the stator casing 20 includes a substantially cylindrical stator casing body 24. The stator casing body 24 of the stator casing 20 may comprise suitable aluminum alloys, steel and/or suitable steel alloys, iron, or any other material with suitable thermal conductivity properties and electromagnetic properties. The stator casing body 24 of the stator casing 20 may be formed via various manufacturing methods, such as, for example, various machining, casting, forging, or molding processes. The stator casing body 24 includes a stator casing wall 26 extending between a first end 28 and a second end 30 along a longitudinal axis 31. The longitudinal axis 31 is substantially coaxial with the rotor shaft 18 and the stator casing body 24 of the stator casing 20. The stator casing wall 26 includes an interior surface 32 defining an inner surface of stator casing wall 26 and an exterior surface 34 defining an outer surface of stator casing wall 26. The interior surface 32 generally defines a cylindrical internal cavity 36 for receiving the electric device 12. At its first end 28, the stator casing wall 26 includes an opening 38. The opening 38 and the internal cavity 36 are sized and shaped to receive the electric device 12. More particularly, the stator assembly 14 includes an interior surface defining an inner surface of the stator assembly 14 and an exterior surface defining an outer surface of the stator assembly 14. Thus, when the electric device 12 is received in the internal cavity 36, the exterior surface of the stator assembly 14 is positioned proximal to the interior surface 32 of the stator casing wall 26 to facilitate thermal exchange therebetween.

The exterior surface 34 of the stator casing wall 26 includes a rib 40 that extends from proximal the first end 28 to proximal the second end 30. The rib 40 extends along the exterior surface 34 of the stator casing wall 26 in a substantially helical manner. Intermediate to or adjacent the rib 40, a spiral groove 42 is formed which extends from an inlet end 44 adjacent second end 30 to a terminal end 46 adjacent first end 28 in a substantially spiraling or helical manner. The spiral groove 42 includes a center portion 48 disposed between the inlet end 44 and the terminal end 46. The inlet end 44 is configured to fluidly couple to an inlet port 52, and the terminal end 46 is configured to fluidly couple to an outlet port 50, as is discussed in more detail elsewhere in the present disclosure. More particularly, at the inlet end 44, the spiral groove 42 has a certain width. As the spiral groove 42 transitions from the inlet end 44 to the center portion 48, the width of the spiral groove 42 gradually increases and tapers outward in a direction parallel to the longitudinal axis 31. Toward the terminal end 46, the spiral groove 42 transitions from the center portion 48 to the terminal end 46 where the width of the spiral groove 42 decreases gradually tapering inward in a direction parallel to the longitudinal axis, terminating at the terminal end 46. The gradual taper or widening of the spiral groove 42 proximal the inlet end 44 and the gradual taper or narrowing of the spiral groove 42 proximal the terminal end 46 is selected to maximize the space available to facilitate alignment of the inlet port 52 with the spiral groove 42 and the outlet port 50 with the spiral groove 42 when the stator casing 20 is received in the arm casing assembly 22.

Figure 4:
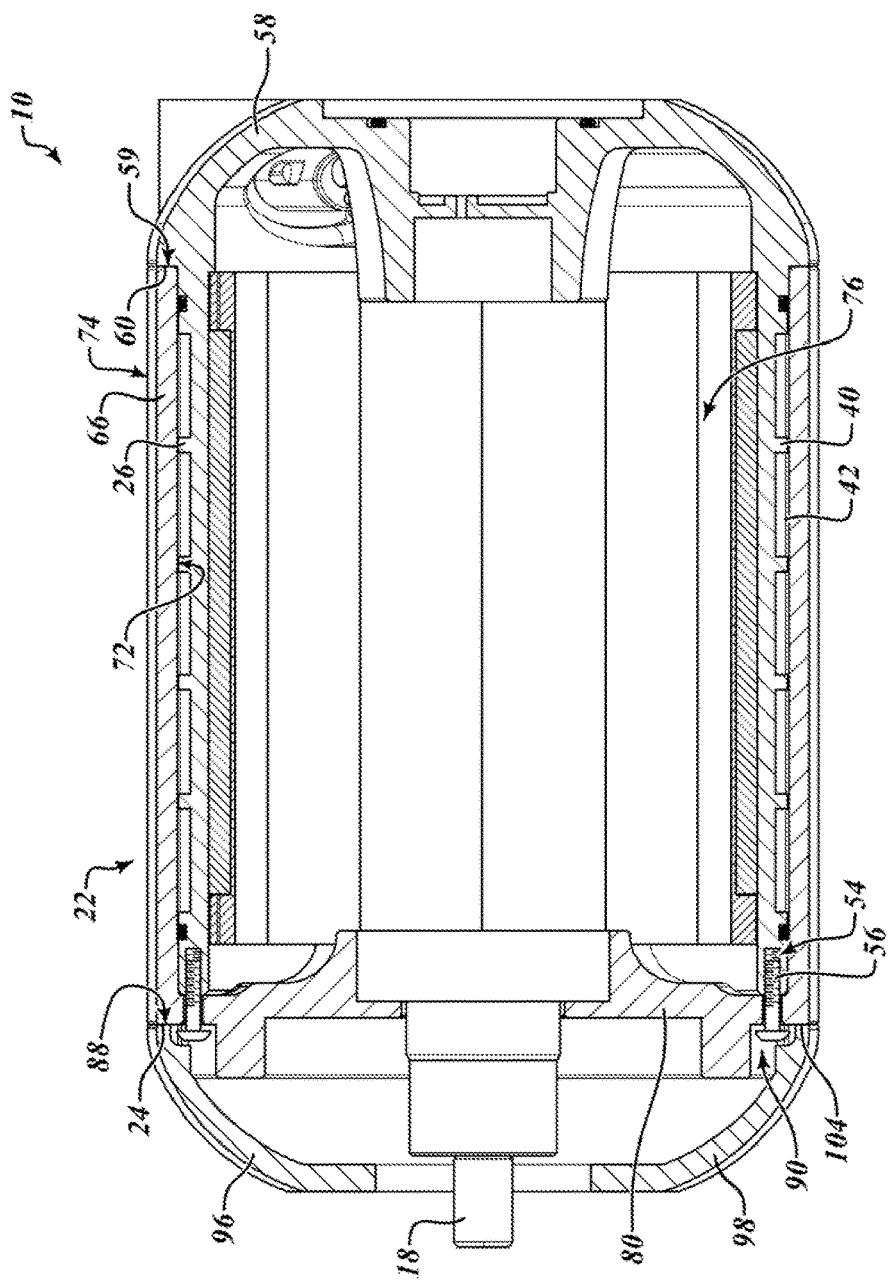
FIG. 4 is a cross-sectional view of the motor cooling system of FIG. 1, taken along line 4-4 of FIG. 2.

At the first end 28 of the stator casing wall 26, the stator casing wall 26 includes a plurality of stator casing wall apertures 54. The stator casing wall apertures 54 are angularly spaced apart with respect to the longitudinal axis 31. The stator casing wall apertures 54 may in some embodiments be regularly spaced apart, such as equiangularly for example, or in other embodiments, may be irregularly spaced apart. Further, the number of stator casing wall apertures 54 may vary and can be selected based on the strength requirements, e.g., the holding force needed to retain the arm casing assembly 22, spatial considerations, or the like. As seen in FIG. 4, the stator casing wall apertures 54 extend into the stator casing wall 26 a certain depth. For example, in the embodiment illustrated in FIGS. 1 through 4, the stator casing wall apertures 54 are tapped into the stator casing wall 26, and are configured to receive corresponding casing fasteners 56. Alternatively, in other embodiments, the stator casing wall 26 may include a flange that extends radially inward with respect to the longitudinal axis 31 and includes apertures that extend into the flange. In this manner, the stator casing wall 26 is advantageously configured to provide weight savings, e.g., avoiding the added weight of protrusions, multiple fasteners, etc., simplicity of assembly, improving efficiency of manufacturing and assembly processes, manufacturing cost savings, among other things, by avoiding protrusions, etc., which are used to couple together housings of conventional electric device cooling systems.

The stator casing 20 further includes an outer dome 58 adjacent the second end 30 of the stator casing wall 26. At the second end 30 of the stator casing wall 26, a flange 60 of the outer dome 58 extends radially outward with respect to the longitudinal axis 31 from the exterior surface 34 of the stator casing wall 26 and defines an arm casing receiving surface 59. An exterior surface of the outer dome 58 comprises a substantially semi-hemispherical shape. The semi-hemispherical shape provides a smooth contoured surface at the second end 30 of the stator casing 20. The outer dome 58 further includes a connector opening 62 located at a peripheral portion of the exterior of the outer dome 58. The connector opening 62 is configured to receive an electrical connector 63 of the electric device 12. The connector 63 may include, without limitation, a three phase electrical connector, or any other electrical connector configured to be coupled to an electrical power supply source.

With continued reference to FIGS. 1 through 4, the arm casing assembly 22 is configured to overlie and receive the stator casing 20. The arm casing assembly 22 includes a substantially cylindrical arm casing body 64. The arm casing body 64 of the arm casing assembly 22 may comprise suitable aluminum alloys, steel and/or suitable steel alloys, iron, or any other material with suitable thermal conductivity and electromagnetic properties. The arm casing body 64 of the arm casing assembly 22 may be formed via various manufacturing methods, such as, for example, various machining, casting, forging, or molding processes. The arm casing body 64 of the arm casing assembly 22 includes an arm casing wall 66 extending between a first end 68 and a second end 70 along the longitudinal axis 31. The arm casing body 64 of the arm casing assembly 22 is substantially coaxial with the longitudinal axis 31 and the rotor shaft 18 when the stator casing 20 is received in the arm casing assembly 22. The arm casing wall 66 includes an interior surface 72 defining an inner surface of the arm casing wall 66 and an exterior surface 74 defining an outer surface of the arm casing wall 66. The interior surface 72 generally defines a cylindrical internal cavity 76 of the arm casing assembly 22 for receiving the stator casing 20. More particularly, at its second end 70, the arm casing wall 66 includes an opening 78. The opening 78 and the internal cavity 76 are sized and shaped to receive the stator casing 20, such that when the stator casing 20 is received, the exterior surface 34 of the stator casing wall 26 is positioned substantially proximal to the interior surface 72 of the arm casing wall 66 to facilitate thermal exchange therebetween.

As illustrated in FIGS. 1 and 4, the arm casing wall 66 includes an end wall 80 adjacent the first end 68 of the arm casing wall 66. The end wall 80 extends radially inward with respect to the longitudinal axis 31 and includes a plurality of end wall apertures 82 angularly spaced apart with respect to the longitudinal axis 31. The end wall apertures 82 may in some embodiments be regularly spaced apart, such as equiangularly, or in other embodiments may be irregularly spaced apart. Further, the number of end wall apertures 82 may vary and can be selected based on the strength requirements, e.g., the holding force needed to retain the arm casing assembly 22, spatial considerations, or the like. More particularly, the end wall apertures 82 are configured to be substantially coaxial with the stator casing wall apertures 54 when the stator casing 20 is received in the arm casing assembly 22. When the stator casing 20 is received in the arm casing assembly 22, the end wall apertures 82 align coaxially with the stator casing wall apertures 54 and cooperate together with the casing fasteners 56 to secure the arm casing assembly 22 to the stator casing 20. The end wall 80 includes a first shaft opening 84, located substantially at a center of the end wall 80. The first shaft opening 84 is configured to allow the rotor shaft 18 to protrude therethough when the electric device 12 is received in the stator casing 20 and stator casing 20 is received in the arm casing assembly 22.

The arm casing body 64 can optionally include a frame mount. The frame mount can be configured to couple the arm casing assembly 22 to a frame of a vehicle, for example, which may be operable by the electric device 12.

At its first end 68, arm casing body 64 further includes an arm casing flange 86 extending away from first end 68 and second end 70 in a direction parallel to longitudinal axis 31. Arm casing flange 86 is an annular member that includes an outer peripheral surface 87, an inner peripheral surface 89 and a flange surface 91 which is spaced apart from the first end 68 of arm casing assembly 22. Flange surface 91 extends between ends of outer peripheral surface 87 and inner peripheral surface 89 that are spaced apart from first end 68 of arm casing assembly 22. Outer peripheral surface 87 has a diameter less than the diameter of exterior surface 74 of arm casing assembly 22 and inner peripheral surface 89 has a diameter less than the diameter of outer peripheral surface 87. The difference in between the diameter of exterior surface 74 and outer peripheral surface 87 defines a receiving surface 88. The outer peripheral surface 87 of the arm casing flange 86 includes a plurality of semi-circular grooves 90 which are angularly spaced apart with respect to the longitudinal axis 31. More particularly, the semi-circular grooves 90 are located proximal the end wall apertures 82 and are configured to allow shanks of casing fasteners 56, such as screws, bolts, or the like, to pass through arm casing flange 86 and be received into end wall apertures 82. In this manner, interference of casing fasteners 56 with the arm casing flange 86 can be avoided.

Intermediate or adjacent to the semi-circular grooves 90, flange surface 91 includes a plurality of angularly spaced apart receiving apertures 92. The receiving apertures 92 are tapped into the arm casing flange 86, and are configured to receive corresponding fasteners 94. Further, the receiving apertures 92 may in some embodiments be regularly spaced apart, such as equiangularly, or in other embodiments, may be irregularly spaced apart. Still further, the number of receiving apertures 92 may vary and can be selected based on the strength requirements, e.g., the holding force needed to retain the arm casing assembly 22, spatial considerations, or the like.

Figure 2:
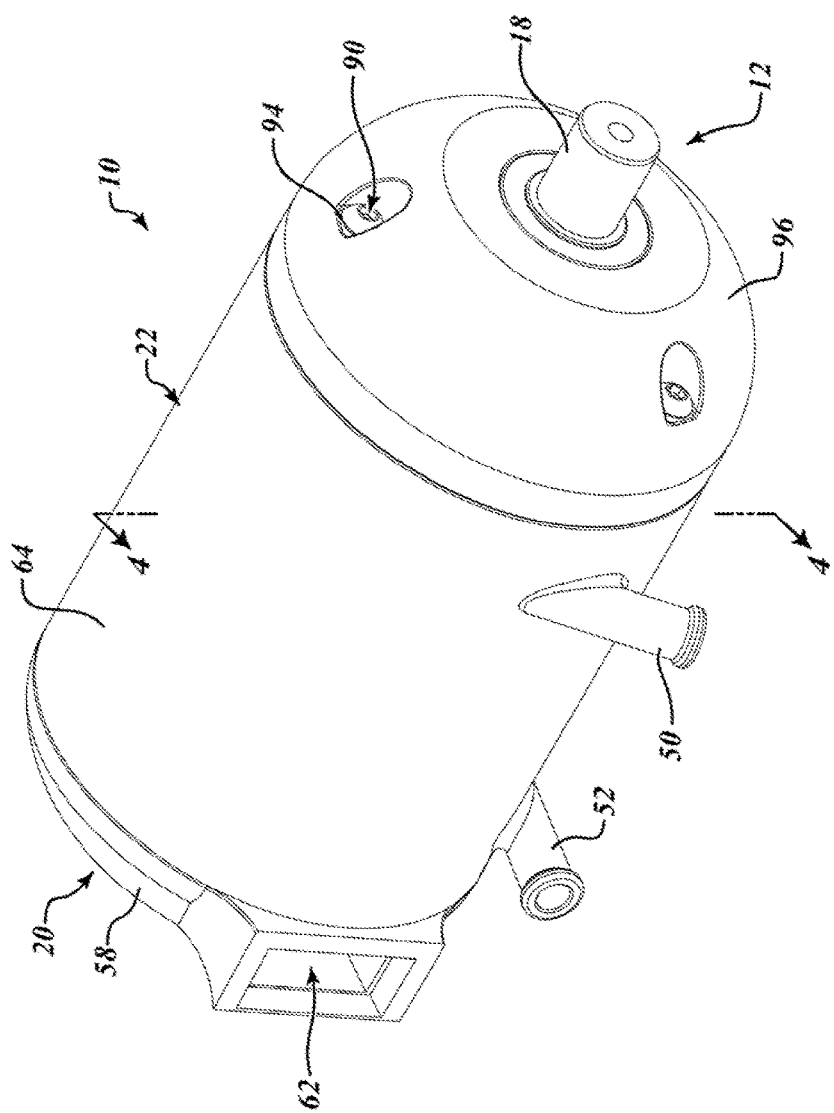
FIG. 2 is a perspective view of the motor cooling system of FIG. 1.

As illustrated in FIGS. 1 and 2, the arm casing body 64 includes an inlet port 52 for receiving a cooling fluid into arm casing body 64 and an outlet port 50 for receiving cooling fluid from the arm casing body 64. The inlet port 52 and the outlet port 50 are located at the exterior surface 74 of the arm casing wall 66. The inlet port 52 and the outlet port 50 may comprise a pipe, a tube, a hose, or other types of conduits configured to transport a coolant or other cooling mediums. As indicated above, the inlet port 52 is fluidly coupled to a coolant source, such as a pump (not shown), for example. The coolant source may supply dry liquid, wet liquid, refrigerant, or any other type of flowable medium with suitable thermal conductive properties to absorb and retain thermal energy generated by the electric device 12. Further, the outlet port 50 may also be fluidly coupled to the coolant source to return the coolant thereto. More particularly, the inlet port 52 is arranged to substantially overlie the inlet end 44 of spiral groove 42 when the stator casing 20 is received in the arm casing assembly 22 and be in fluid communication therewith. Similarly, the outlet port 50 is arranged to substantially overlie the terminal end 46 of spiral groove 42 when the stator casing 20 is received in the arm casing assembly 22 and be in fluid communication therewith.

With continued reference to FIGS. 1 through 4, the motor cooling system 10 further includes an end cover 96 adjacent first end 68 of arm casing assembly 22. The end cover 96 includes an end cover body 98. The end cover body 98 has a substantially semi-hemispherical shape. It is appreciated that in other embodiments, the end cover body 98 may comprise other shapes, including a cylindrical shape, conical shape, or the like. The end cover body 98 includes countersunk recesses 100 angularly spaced apart with respect to the longitudinal axis 31. Each recess 100 overlies a corresponding end cover aperture 102 which extends through the end cover body 98. The end cover apertures 102 are configured to be substantially coaxial with the receiving apertures 92 of the arm casing flange 86 when the end cover 96 is coupled to the arm casing assembly 22.

In particular, the end cover 96 includes a peripheral flange 104 extending parallel to the longitudinal axis 31 from an edge of the end cover body 98 that is adjacent to the first end 68 of arm casing wall 66 when the end cover 96 is coupled to the arm casing assembly 22. The peripheral flange 104 includes an outer diameter that is substantially the same as an outer diameter of the arm casing body 64. The end of the peripheral flange 104 adjacent the edge of the peripheral flange 104 adjacent to the first end 68 of arm casing wall 66 when the end cover 96 is coupled to the arm casing assembly 22 has a profile which mates with the receiving surface 88. The interior surface of peripheral flange 104 adjacent the edge of the peripheral flange 104 adjacent to the first end 68 of arm casing wall 66 when the end cover 96 is coupled to the arm casing assembly 22 has a profile that mates with the profile of the arm casing flange 86. Thus, when the end cover 96 is coupled to the arm casing assembly 22, an end of the peripheral flange 104 substantially abuts or contacts the receiving surface 88 of the end wall 80, and the end cover 96 and the arm casing assembly 22 forms a smooth, continuous exterior. Additionally, the end cover body 98 includes a second shaft opening 106 located at substantially the center of the end cover body 98, substantially coaxial with the rotor shaft 18 when electric device 12 and stator casing 20 are received in arm casing assembly 22. The second shaft opening 106 is configured to allow the rotor shaft 18 to protrude therethough when the end cover 96 is coupled to the arm casing assembly 22.

The embodiments illustrated and described herein provide motor cooling systems and devices that are simple to manufacture and assemble, efficient at removing thermal energy from electric devices, and compact. For example, when the electric device 12 is received in the stator casing 20 and the arm casing assembly 22 is overlaid over the stator casing 20 and electric device 12, the second end 70 of the arm casing wall 66 substantially abuts or contacts the flange 60 of the outer dome 58. The outer diameter of the arm casing wall 66 is substantially equal to the outer diameter of the flange 60 of the outer dome 58, thus providing a smooth and continuous exterior surface less prone to accumulate unwanted debris compared to electric device housings that do not have a smooth and continuous exterior surface. When assembled, the arm casing assembly 22 is coupled to the stator casing 20 through casing fasteners 56 extending from the end wall apertures 82 to the stator casing wall apertures 54. The stator casing wall apertures 54 are positioned at and in the first end 28 of the stator casing wall 26 where they can reversibly receive and secure casing fasteners 56 without the need for additional structure such as ribs, flanges, protrusions, or other elements that add weight and require space that compromises compactness of the motor cooling system 10. When the arm casing assembly 22 is coupled to the stator casing 20, the semi-hemispherical shape of the outer dome 58 and the smooth and continuous exterior of the motor cooling system 10 advantageously improve the drag coefficients, and consequently the drag forces acting on the electric device 12. By way of example, in certain applications, such as electric scooters, the electric device 12 is exposed to the ambient air, thus, reducing or limiting the drag forces, which leads to improved performance, such as increased speed and range. The smooth and continuous exterior leads to less accumulation of unwanted debris on the electric device 12, debris that otherwise would increase the weight of the electric device 12 and impede exchange of thermal energy between the electric device 12 and the ambient environment.

The end cover 96 is overlaid over the arm casing assembly 22 and the electric device 12, and an end of the peripheral flange 104 substantially abuts or contacts the receiving surface 88 of the end wall 80. The outer diameter of the peripheral flange 104 is substantially equal to the outer diameter of the arm casing body 64, thus providing a smooth continuous exterior surface less prone to accumulate unwanted debris compared to electric device housings that do not have a smooth and continuous exterior surface. When assembled, the end cover 96 is coupled to the arm casing body 64 through fasteners 94 extending from the end cover apertures 102 to the receiving apertures 92. The receiving apertures 92 are positioned at and in the arm casing flange 86 of the arm casing assembly 22 where they can reversibly receive and secure fasteners 94 without the need for additional structure, such as ribs, protrusions, or other elements that add weight and require space that compromises compactness of the motor cooling system 10. When the end cover 96 is coupled to the arm casing assembly 22, the semi-hemispherical shape of the end cover 96 and the smooth and continuous exterior of the motor cooling system 10 advantageously improve the drag coefficients, and consequently the drag forces acting on the electric device 12. As indicated above, in certain applications, such as electric scooters, the electric device 12 is exposed to the ambient air, thus reducing or limiting the drag forces, which leads to improved performance, such as increased speed and range. The smooth and continuous exterior leads to less accumulation of unwanted debris on the electric device 12, debris that otherwise would increase the weight of the electric device 12 and impede exchange of thermal energy between the electric device 12 and the ambient environment.

In use, as described above, the inlet port 52 may be fluidly coupled to a coolant source, such as a pump in fluid communication with a coolant reservoir, for example, a radiator. As the coolant is supplied to the motor cooling system 10, it flows into spiral groove 42 from coolant inlet 52 and follows a flow path indicated by arrow 108 in FIG. 3. The specific size and shape of the spiral groove 42, for example pitch, width, depth, etc., are advantageously selected to impart spin and shear stress into the coolant flow, and additionally to maximize the heat transfer surface areas, improve flow rates, and consequently the heat transfer efficiency of the motor cooling system 10. By way of example, the spin and shear stress imparted into the coolant flow can cause turbulent fluctuations which enhance the heat transfer rate. The large surface shear stress resulting from the turbulent fluctuations at the turbulent boundary layer can result in a large surface temperature gradient, which enhances the convection heat transfer rate, thus improving the heat transfer efficiency of the motor cooling system 10. The coolant continues to flow along the flow path facilitating thermal exchange between the coolant and the electric device 12, terminating at the terminal end 46 and exiting through the outlet port 50. The outlet port 50 may be fluidly coupled to the coolant source to return the coolant, for example, to the coolant reservoir in fluid communication with the pump.

The various embodiments described above can be combined to provide further embodiments.

In accordance with the subject matter described herein, embodiments illustrative of the motor cooling systems for cooling a motor unit including a stator assembly and a rotor assembly configured to rotate a rotor shaft include a stator casing in accordance with the description above configured to receive the motor unit and an arm casing assembly in accordance with the description above configured to receive the stator casing.

These and other changes can be made to the embodiments in light of the above-detailed description. For example, the illustrative embodiments presented herein should not be limited to the specific descriptions and/or illustrations of features like the stator assembly, rotor assembly, stator casing, arm casing assembly, end cover and outer dome and components thereof. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A motor cooling system for cooling a motor unit including a stator assembly and a rotor assembly configured to rotate a rotor shaft, the motor cooling system comprising:
 a stator casing including a generally cylindrical stator casing body having a longitudinal axis, the stator casing body including:
  a stator casing wall extending between a first end and a second end of the stator casing body, the stator casing wall including an interior surface and an exterior surface, the interior surface of the stator casing wall defining an internal cavity in the stator casing, the internal cavity configured to receive the motor unit, the second end of the stator casing body including an outer dome, the outer dome including a protrusion extending radially outward, the protrusion being formed with a connector opening; and
  a rib on the exterior surface of the stator casing wall extending along the exterior surface of the stator casing wall, a groove defined between adjacent portions of the rib;
 an arm casing including a generally cylindrical arm casing body, the arm casing body including:
  an arm casing wall extending between a first end and a second end of the arm casing body, the arm casing body defining an arm casing cavity in the arm casing body, the arm casing cavity configured to receive the stator casing therein;
  an end wall adjacent the second end of the arm casing body and radially extending inward from the arm casing wall toward the longitudinal axis; and
  a port located in the arm casing wall, the port being in fluid communication with the groove.

2. The motor cooling system of claim 1 wherein the rib extends substantially helically along the exterior surface of the stator casing wall.

3. The motor cooling system of claim 1 wherein the end wall includes a plurality of end wall apertures, the end wall apertures angularly spaced with respect to the longitudinal axis.

4. The motor cooling system of claim 3 wherein the stator casing wall includes a plurality of stator casing wall apertures, the stator casing wall apertures being substantially coaxial with corresponding end wall apertures when the stator casing is received in the arm casing.

5. The motor cooling system of claim 1 wherein the outer dome including a flange, the flange radially extending outward with respect to the longitudinal axis, the flange having an outer diameter that is substantially equal to an outer diameter of the arm casing.

6. The motor cooling system of claim 5 wherein the connector opening is configured to receive an electrical connector for the motor unit.

7. The motor cooling system of claim 1, further comprising:
 an end cover coupleable to the end wall of the arm casing body.

8. The motor cooling system of claim 7 wherein the end cover includes a plurality of end cover apertures angularly spaced with respect to the longitudinal axis and the end wall of the arm casing body includes a plurality of receiving apertures, the receiving apertures being substantially coaxial with corresponding end cover apertures when the end cover is coupled to the end wall of the arm casing body.

9. The motor cooling system of claim 7 wherein the end cover includes a peripheral flange, the peripheral flange having an outer diameter that is substantially equal to an outer diameter of the arm casing.

10. The motor cooling system of claim 1 wherein the groove includes an inlet end, a terminal end, and a center portion between the inlet end and the terminal end, the groove tapering outwardly to smoothly transition from the inlet end to the center portion and the groove tapering inwardly to smoothly transition from the center portion to the terminal end.

11. An electric motor including a cooling system for facilitating thermal exchange between an electric motor unit and a coolant received from a coolant source, the electric motor comprising:
- a stator casing including a generally cylindrical stator casing body having a longitudinal axis, the stator casing body including:
  - a stator casing wall extending between a first end and a second end of the stator casing body, the stator casing wall including an interior surface and an exterior surface, the interior surface of the stator casing wall defining an internal cavity in the stator casing, the internal cavity configured to receive the electric motor unit, the second end of the stator casing body including an outer dome, the outer dome including a protrusion extending radially outward, the protrusion being formed with a connector opening;
  - a rib on the exterior surface of the stator casing wall extending substantially helically along the exterior surface of the stator casing wall, a groove defined between adjacent portions of the rib; and
- an arm casing including a generally cylindrical arm casing body, the arm casing body including:
  - an arm casing wall extending between a first end and a second end of the arm casing body, the arm casing body defining an arm casing cavity in the arm casing body, the arm casing cavity configured to receive the stator casing therein.

12. The electric motor of claim 11 wherein the arm casing body includes an end wall adjacent the second end of the arm casing body and radially extending inward from the arm casing wall toward the longitudinal axis.

13. The electric motor of claim 11 wherein the outer dome including a flange, the flange radially extending outward with respect to the longitudinal axis, the flange having an outer diameter that is substantially equal to an outer diameter of the arm casing.

14. The electric motor of claim 13 wherein the groove is in fluid communication with an inlet port and an outlet port located in the arm casing, the inlet port and the outlet port located at opposite ends of the groove.

15. The electric motor of claim 14 wherein the groove includes an inlet end, a terminal end, and a center portion between the inlet end and the terminal end, the groove tapering outward to smoothly transition from the inlet end to the center portion and the groove tapering inward to smoothly transition from the center portion to the terminal end.

16. The electric motor of claim 11, further comprising:
- an end cover coupleable to an end wall of the arm casing body, the end cover including a peripheral flange, the peripheral flange having an outer diameter that is substantially equal to an outer diameter of the arm casing.

17. The electric motor of claim 11 wherein the arm casing body includes an end wall adjacent the second end of the arm casing body and radially extending inward from the arm casing toward the longitudinal axis, the end wall including a plurality of end wall apertures angularly spaced with respect to the longitudinal axis, the plurality of end wall apertures positioned to substantially align with corresponding stator casing wall apertures when the stator casing is received in the arm casing.

18. The motor cooling system of claim 5 wherein the outer dome has a semi-hemispherical shape.

19. The electric motor of claim 13 wherein the outer dome has a semi-hemispherical shape.

20. The electric motor of claim 11 wherein the connector opening is configured to receive an electrical connector for the electric motor unit.

* * * * *